March 13, 1956 — O. H. CHUPP — 2,738,161
WIRE LINE GUIDE AND STABILIZER
Filed April 5, 1954 — 3 Sheets-Sheet 1
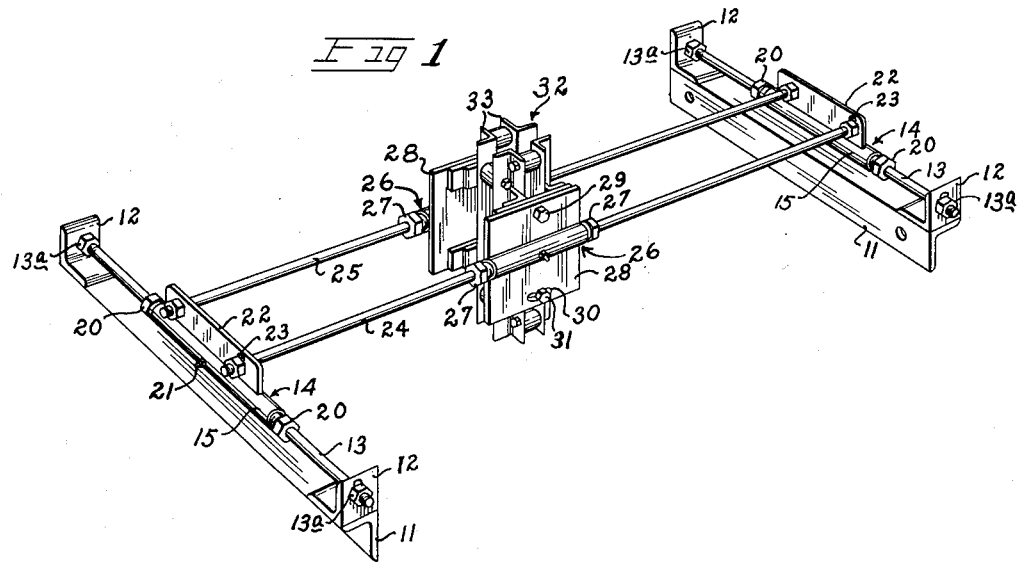
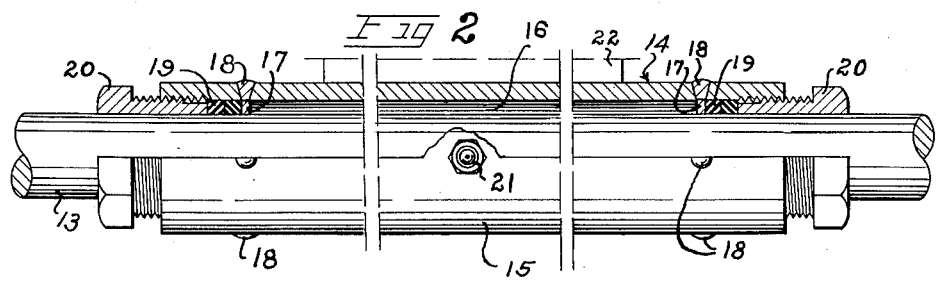
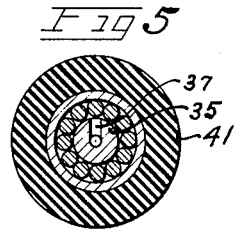
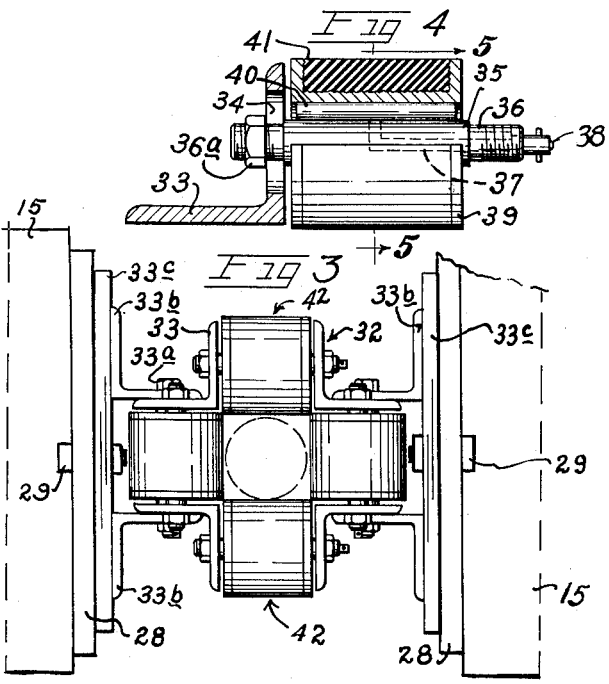
Otis H. Chupp
INVENTOR.
BY
Wayland D. Keith
HIS AGENT

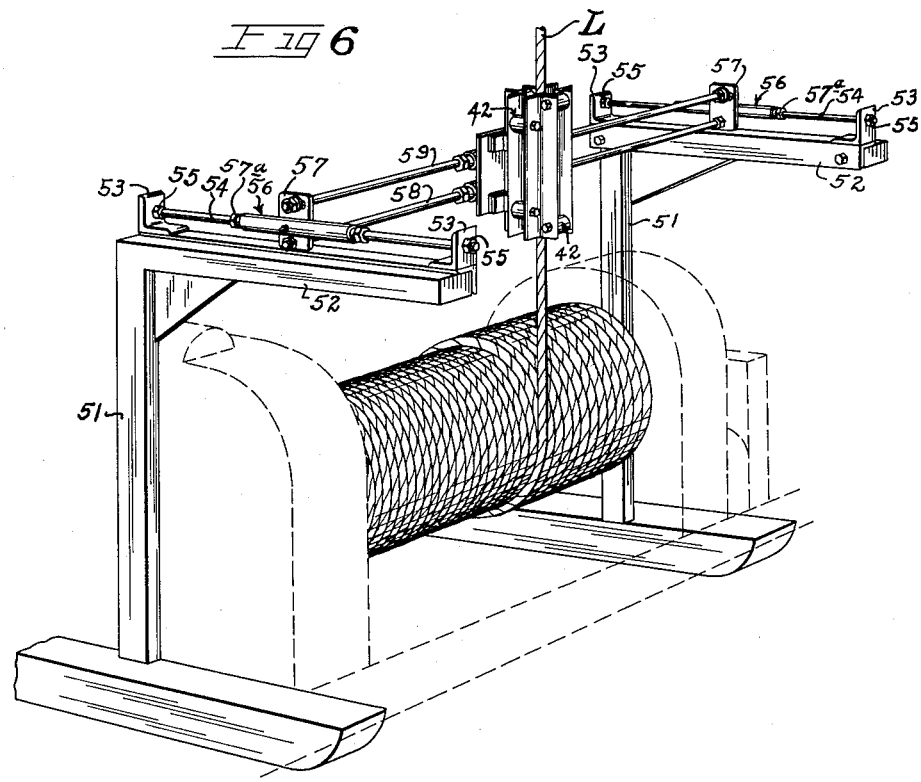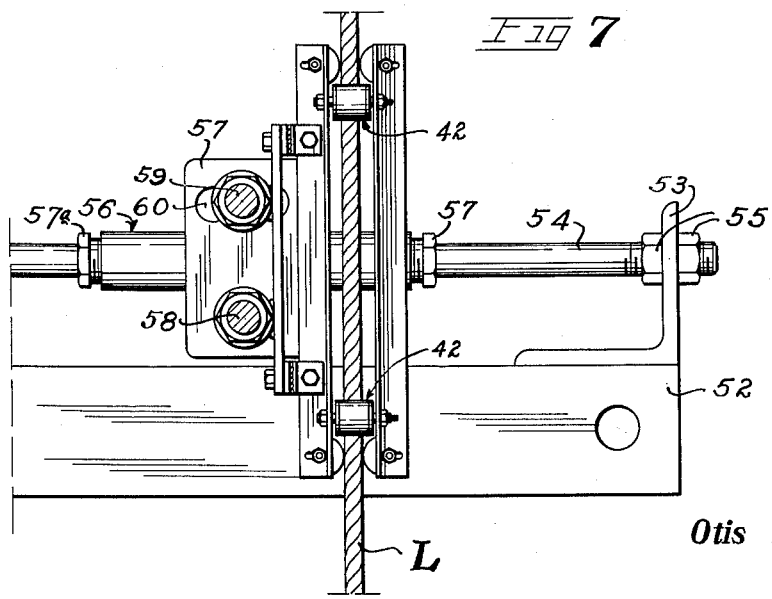

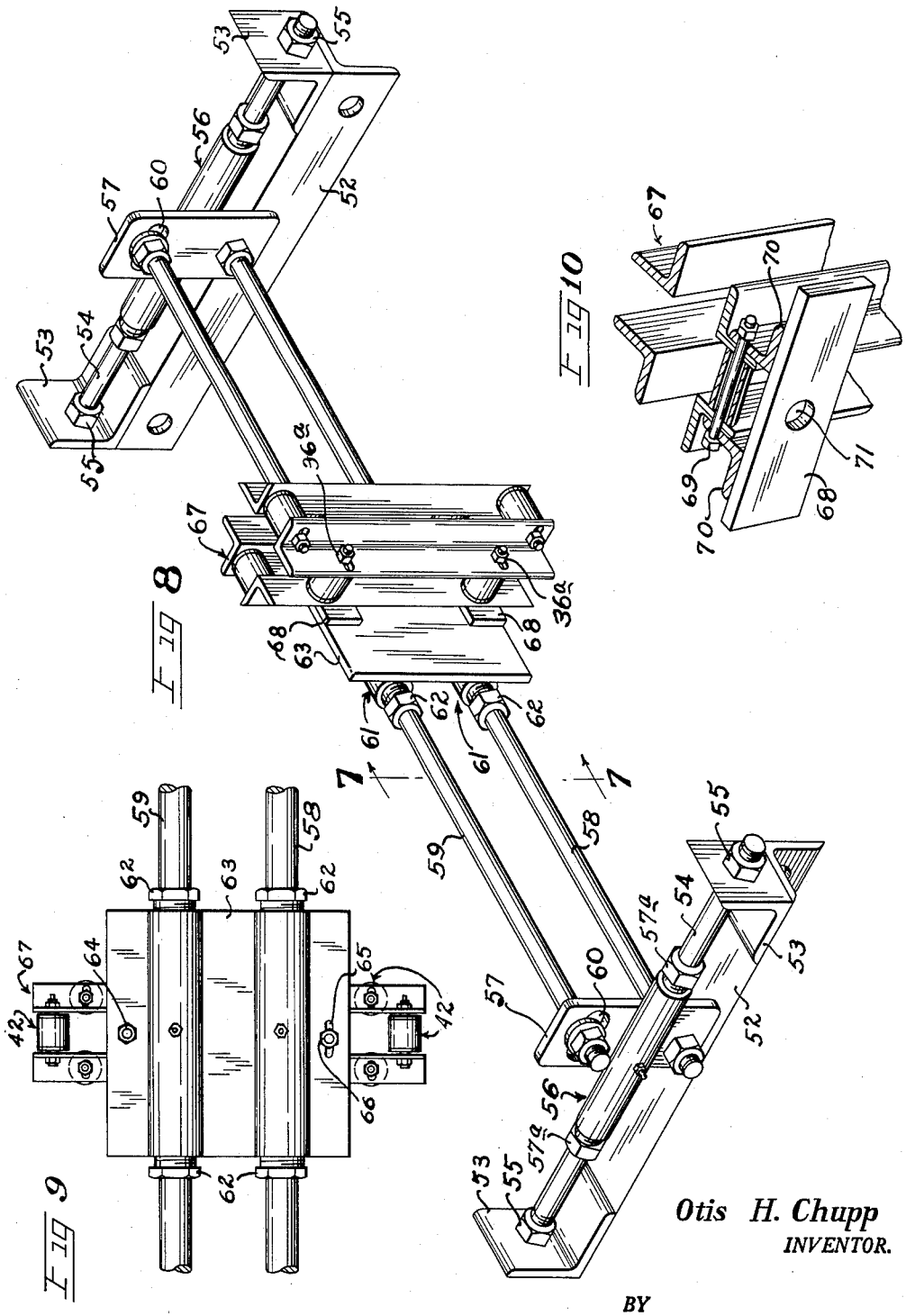

United States Patent Office 2,738,161
Patented Mar. 13, 1956

2,738,161
WIRE LINE GUIDE AND STABILIZER

Otis H. Chupp, Wichita Falls, Tex.

Application April 5, 1954, Serial No. 420,841

6 Claims. (Cl. 254—190)

This invention relates to improvements in wire line guides and stabilizers for guiding wire line on to spooling drums and more particularly to wire line guides and stabilizers wherein each movement of the wire line guide is restrained against movement in any direction, therefore the line is caused to spool in close fitting relation with the adjacent convolutions being wound on the spooling drum or with the ends of the spooling drum.

The present wire line guide and stabilizer lends itself to many uses, such as spooling cable on to a spooling drum of rotary and cable tool drilling rigs, power hoists, winches and the like, so as to prevent the cable spooling onto the drum in loose fitting relation causing the cable to wedge between previous convolutions of the cable.

The winding of relatively heavy steel cable on to a winding drum is particularly difficult unless the cable is wound onto the drum while it is held relatively tight against the previous convolutions, but not so tightly as to cause a cable to climb up on the adjacent convolutions of the same layer.

An object of the present invention is to provide for a uniform drag tension on the lateral movement of the cable to hold the cable in tight fitting relation with the end of the drum and with the adjacent convolutions of cable of the same layer, to insure winding at uniform tightness throughout the spooling of the cable onto the drum.

Another object of the invention is to provide a wire line guide and stabilizer on which the tendency to move either longitudinally or transversely of the drum is uniformly retarded a predetermined degree so as to cause uniform tightness of the convolutions spooled onto the spooling drum.

Still another object of the invention is to provide a wire line guide and stabilizer that will guide cable of any size onto a spooling drum with the abutting convolutions of the cable being in tight fitting relation, without the necessity of adjustments.

A still further object of the invention is to provide a wire line guide and stabilizer which may be adjusted to spool the convolutions of cable in abutting relation with adjacent convolutions in varying degrees of tightness.

Yet another object of the invention is to provide a wire line guide and stabilizer that will hold the cable inward toward the center of the spooling drum a predetermined tightness as the multi-layers of the cable increase on the drum.

A yet further object of the invention is to provide a damping device to reduce or eliminate cable whip as it spools onto a wire line spooling drum.

Still another object of the invention is to provide a cable guide and stabilizer which may be adjusted with respect to the size of the cable being spooled.

A further object of the invention is to provide a cable guide and stabilizer that can be locked in a set position to guide the cable onto the drum or permit it to swing longitudinally of the drum so as to align the angularity of the cable with the spooling point of the drum.

Still another object of the invention is to provide a device to which the transverse angularity of the cable spooling device may be adjusted with respect to the drum.

A final object of the invention is to provide a cable guiding and stabilizing device that is simple in construction and operation, and which is adapted to various functions with respect to spooling cable.

With these objects in mind and others that will manifest themselves as the description proceeds, reference is to be had to the accompanying drawings, in which like reference characters designate like parts in the several views thereof, in which:

Fig. 1 is a perspective view of one form of the invention showing the device apart from a machine utilizing a cable spool drum;

Fig. 2 is a fragmentary elevational view, with parts broken away and shown in section, of one of the retarding elements, and showing a lubricant chamber therein;

Fig. 3 is a top plan view of the cable guide roller assembly bolted to the supporting plate, but removed from the friction drag members;

Fig. 4 is a fragmentary plan view of one of the cable guide rollers and a supporting frame therefor, with parts broken away, and other parts removed, to show the details of construction;

Fig. 5 is a sectional view taken on the line 5—5 of Fig. 4, looking in the direction indicated by the arrows;

Fig. 6 is a perspective view of a modified form of invention, showing the device mounted on a supporting frame-work of the draw-works of a drilling rig, and showing a portion of the draw-works in dashed outline but showing the cable on the spooling drum in full lines;

Fig. 7 is a fragmentary sectional view taken on the line 7—7 of Fig. 8, of the form of invention as shown in Fig. 6, looking in the direction indicated by the arrows, and showing a cable positioned in the cable guide thereof;

Fig. 8 is a perspective view similar to Fig. 1, but of the modified form of invention;

Fig. 9 is a fragmentary elevational view of the opposite side of the cable guiding mechanism from that shown in Fig. 8, of the modified form of the invention; and Fig. 10 is a fragmentary perspective view of the modified form of invention, with parts broken away and shown in section of a portion of the cable guide frame, showing the manner of connecting the frame-work together.

With more detailed reference to the drawing, the numeral 11 designates a frame or base member, for the form of invention as shown in Figs. 1 through 5, on which upstanding brackets 12 are mounted, and secured thereto as by welding or the like. The upstanding legs of the respective pairs of brackets 12 are apertured to receive rods 13 therein in parallel relation. The rods 13 are screw threaded at each end for a material distance beyond the normally required distance for the nuts 13a, which are positioned on each side of the upstanding lugs 12. This enables a longitudinal adjustment of the rod with respect to the upstanding brackets 12 and the double nuts enable the rods to be locked securely in place with respect to brackets 12. The rods 13 are spaced apart and each rod has a friction drag member, indicated generally by the numeral 14, which drag member comprises a shell 15 in which a lubricant compartment 16 is formed by partitions 17, which partitions 17 are spot welded in place, as indicated at 18. Each partition also defines a packing chamber in which packing rings 19 are disposed.

Each end of each of the shells 15 is screw threaded to receive an adjustable packing nut 20 which fits around rod 13 and may be screwed against packing 19 in such manner as to squeeze the packing against rod 13 to obtain the desired tightness on the rod so as to retard the movement of the unit 14 along the rod and at the same time the packing serves to retain lubricant within the lubricant compartment 16. A lubricant fitting 21 is provided within shell 15 for introducing lubricant thereinto.

An upstanding bracket 22 is welded or otherwise secured to each of the shells 15 and each of the brackets have horizontally spaced apertures therein to receive longitudinally parallel rods 24 and 25. It is preferable to have at least one of the apertures in each upstanding bracket 22, slotted as indicated at 23 so as to enable the rod 24 to be moved up or down to obtain the proper adjusted relation with respect to rod 25.

A friction drag member, designated generally at 26, has packing nuts 27 in each end thereof and which drag members are of substantially the same construction as the drag members 14 illustrated in Fig. 2. The drag members are mounted longitudinally on the respective rods 24 and 25. Each of the members 26 has a plate 28 secured to the inner face thereof, as by welding. Each of the plates 28 is apertured near the upper end thereof to receive a bolt 29 and each has an arcuate slot 30 near the lower end thereof, which slot is radially disposed with respect to bolt 29. The respective slots 30 each have a bolt 31 mounted therein that may be locked in secure relation with respect to the respective plates or it may be loosened so as to swing about the axis of the respective bolt 29 upon swinging movement of the cable guide which is generally designated at 32.

The cable guide 32 comprises angles 33 that have a pair of spaced apertured slots 34 in each leg thereof, which slots each receive a shouldered axle pin 35 therethrough that is threaded at each end, as indicated at 36. The oppositely disposed pair of angles 33 have their legs that extend outward toward the guide rods 24 and 25 provided with spaced apertures to receive bolts 33a therethrough and through pairs of angle brackets 33b that are welded to the respective bars 33c. The bars 33c are each apertured to complementarily align with the respective apertures in the plates 28 so that bolts 29 and 31 will pass through the respective apertures. Nuts for the respective bolts 29 and 30 are preferably welded to the inner face of the respective bars 33c so as to enable the bolts to be easily tightened.

Each of the shouldered pins has a passage formed therethrough. A grease fitting 38 is positioned in one end of the pin 35 so as to conduct lubricant therethrough to a point intermediate the length of the pin 35. A spool memebr 39 has bearings 40 therein which bearings interfit on shouldered axle pin 35, as will best be seen in Figs. 4 and 5. The groove of the spool 39 is filled with a rubber-like resilient material 41 which is bonded to the spool so as to obviate wear on the cable and to give longer wearing qualities to the cable guide rollers, generally designated by the numeral 42.

*Operation of the form of invention shown in Figs. 1 through 5*

When the form of the invention as shown in Figs. 1 is used in connection with a draw-works, such as shown in Fig. 6, the base members 11 are connected with a portion of the framework of the draw-works frame so that the rods 24 and 25 are parallel with the longitudinal axis of the spooling drum and with the rods 13 so positioned that the drag members 14 may move back and forth so that the cable guide 32 can guide cable into the spooling drum from the first layer to the maximum number of layers superposed on the spooling drum. With the device installed in this manner and with the cable threaded between rollers 42, and with rollers 42 adjusted inward to hold the cable in the desired manner therebetween, the lubricant chamber 16 of the respective drag members 14 and 26 are filled with lubricant and the nuts 20 are tightened to compress the packing rings in the respective members until a frictional drag is exerted on the respective rods 13, 24, and 25. The more the packing nuts 20 and 27 are tightened, the more drag is exerted on the rods and consequently the respective units 14 and 26 will resist movement which will cause a tighter spooling of the convolutions of cable onto the spool. However, the cable should not be tight enough to cause it to climb up the adjacent convolution of the same layer. As the cable moves from end to end on each layer being spooled on the drum, the drag is exerted to cause the cable to spool tightly against the adjacent convolutions after the second and each successive layer of cable being spooled upon the drum, the members 14 are moved outward slightly, but will hold the cable tightly against the drum or the previously spooled layer of cable so as to prevent the cable from climbing up on the adjacent layer of the previously spooled convolution of cable.

If desired, the rod 24 may be adjusted vertically so as to more nearly guide the cable at the proper angle with respect to the normal spooling surface. Upon loosening bolts 31, the angle member 32 may swing about pivot of bolts 29 so as to obtain the proper spooling of the cable.

*Modified form*

The modified form of the invention, as shown in Figs. 6 through 10 is similar in construction, to the form described above, and the frame 51 of the draw-works has a pair of frame or base members 52 of the wire line guide and stabilizer, mounted thereon with a pair of upstanding brackets 53 near each end thereof. The upstanding brackets 53 are each apertured to receive transverse rods 54 that are screw threaded at each end to receive nuts 55 on each side of upstanding brackets 53 and for adjustment of the rods longitudinally with respect to the upstanding brackets 53. A drag member 56, having a packing nut 57a thereon is mounted on each of the rods 54 to provide a proper drag and also to provide lubrication therefor. The drag members 56 are substantially of the same construction as the drag members shown in Fig. 2 and further detailed description is not deemed necessary.

A bracket 57 is welded or otherwise secured to each drag member 56, as will best be seen in Fig. 7, so that the bracket extends above and below a medial line between the respective drag members. The brackets 57 are each apertured above and below the respective drag members to receive rods 58 and 59. One of the apertures of each bracket 57 is indicated as being slotted at 60 to enable the relative transverse adjustment of rod 59 with respect to rod 58. The rods 58 and 59 have drag members 61 thereon each of which has a packing nut 62 screw threaded thereinto to provide the proper drag on rods 58 and 59 and are constructed similar to the showing in Fig. 2.

A plate 63 is welded or otherwise secured to drag members 61 and which plate is apertured at the top and bottom, as indicated in Fig. 9. The upper aperture receives a bolt 64 and the lower aperture, which is indicated as a slot 65, receives a bolt 66.

A cable guide member, generally designated by the numeral 67, is substantially like the cable guide member designated at 32 and described above, and has pairs of bars 68 spaced apart and secured thereto by means of bolt 69 that passes therethrough, and through lugs 70 which are welded to the respective bars 68. Each of the bars 68 has a hole 71 formed therethrough to receive bolts 64 and 66 respectively. By loosening bolts 66, the cable guide member 67 will swing about bolts 64 as the pivot points. The rollers of cable guide member 67 are constructed substantially in accordance with the rollers as shown in Figs. 4 and 5, however, the cable may be removed laterally from the cable guide member 67, by removal of the four nuts 36a, as will best be seen in Fig. 8, thus obviating the necessity of having to remove one of the bars, which would be necessary in the form of the invention as shown in Fig. 1. The cable may be threaded between the rollers of the cable guide member without having to remove any portion of the cable guide member in either of the forms.

The operation of the modified form of the invention as shown in Figs. 6 through 10, is substantially the same as for the form described above, except for the lateral insertion and removal of the cable from the guide member 67. This form of device is particularly advantageous when both ends of the cable are anchored.

Having thus described the invention, what is claimed as new and desired to secure by Letters Patent is:

1. In a wire line guide and stabilizer, a pair of base members, a pair of upstanding lugs mounted on each of said base members, a bar secured between each pair of said outstanding lugs, which bars are parallel, a shell member telescoped over each of said bars, a friction gland member on an end of each of said shell members, a pair of longitudinal, spaced apart, parallel bars, the respective adjacent ends of said pair of bars being secured to the respective shell members, a second pair of shell members, one of each being mounted on the respective longitudinal bars, a friction gland member on an end of each of said second shell members, and a cable guide member mounted on said second pair of shell members intermediate said pairs of bars for guiding cable onto a spooling drum along the length of said longitudinal bars.

2. In a wire line guide and stabilizer, a pair of base members, a pair of upstanding lugs mounted on each of said base members, a bar secured between each pair of said outstanding lugs which bars are parallel, a shell member telescoped over each of said bars, an adjustable friction gland member on each end of each of said shell members, a pair of longitudinal, spaced apart, parallel bars mounted on the respective shell members, a second pair of shell members, one mounted on each of said longitudinal bars, an adjustable friction gland member on each end of each of said second shell members, and a cable guide member mounted on said second pair of shell members intermediate said pairs of bars for guiding cable onto a spooling drum along the length of said longitudinal bars.

3. In a wire line guide and stabilizer, a pair of base members, a pair of upstanding lugs mounted on each of said base members, a bar secured between each pair of upstanding lugs, which bars are parallel, a shell member telescoped over each of said bars, a friction gland member on each end of each of said shell members, a lubricant chamber formed by each of said shell members, means of introducing lubricant into each of said shell members, a pair of longitudinal, spaced apart, parallel bars mounted on the respective adjacent ends of said pair of bars being secured to the respective shell members, a second pair of shell members mounted on the respective longitudinal bars, a friction gland member on each end of each of said second shell members, a lubricant chamber formed by each of said second mentioned shell members, means of introducing lubricant into said chambers, and a cable guide member mounted on said second pair of shell members for guiding cable onto a spooling drum along the length of said longitudinal bars.

4. In a wire line guide and stabilizer, a pair of base members, a pair of upstanding lugs mounted on each of said base members, a bar secured between each pair of said outstanding lugs, which bars are parallel and arranged in a horizontal plane, a shell member telescoped over each of said bars, a friction gland member on an end of each of said shell members, a pair of longitudinal, spaced apart, parallel bars arranged in a horizontal plane, the respective adjacent ends of said pair of bars being secured to the respective shell members, a second pair of shell members mounted on the respective longitudinal bars, a friction gland member on an end of each of said second shell members, and a cable guide member mounted between and secured to said second shell members intermediate said pairs of bars for guiding cable onto a spooling drum along the length of said longitudinal bars.

5. In a wire line guide and stabilizer, a pair of base members, a pair of upstanding lugs mounted on each of said base members, a bar secured between each pair of outstanding lugs, which bars are parallel and arranged in a horizontal plane, a shell member telescoped over each of said bars, a friction gland member on an end of each of said shell members, a pair of longitudinal, spaced apart, parallel bars arranged in a horizontal plane, the respective adjacent ends of said pair of bars being secured to the respective shell members, a second pair of shell members mounted on the respective longitudinal bars, a friction gland member on an end of each of said second shell members, a cable guide member mounted between and secured to said second shell members intermediate said pairs of bars for guiding cable onto a spooling drum along the length of said longitudinal bars, said cable guide member having a pivot member near one end thereof and having an arcuate slot formed therein near the other end thereof so as to permit lateral swinging movement of said cable guide member about said pivot member in a plane parallel of said longitudinal bars, fastening means within said arcuate slot adapted to selectively secure said guide member in a fixed angular position with respect to said longitudinal bars.

6. In a wire line stabilizer and guide for a cable drum, a pair of base members, a pair of parallel bars mounted on said base members, one bar of said pair being at each end of said drum and being mounted transversely with respect to the axis thereof, a member mounted on each of said bars and being adapted to slide therealong, a mounting bracket mounted on each of said members, a pair of longitudinal bars positioned between said brackets which bars are substantially parallel with the axis of said drum, a pair of slide members positioned on said longitudinal bars, a cable guide member mounted on said slide members and positioned intermediate said pairs of bars, and means for regulating the frictional engagement of said slide members with respect to said bars.

References Cited in the file of this patent

UNITED STATES PATENTS

| | | |
|---|---|---|
| 2,422,353 | Hitt | June 17, 1947 |
| 2,478,486 | Holleron et al. | Aug. 9, 1949 |
| 2,660,382 | Wilson | Nov. 24, 1953 |
| 2,681,793 | Miller | June 22, 1954 |